United States Patent [19]

Noda et al.

[11] Patent Number: 4,755,428
[45] Date of Patent: Jul. 5, 1988

[54] POLYIMIDE POWDER AND METHOD FOR PRODUCING THE SAME

[75] Inventors: Yuzuru Noda, Kyoto; Keizo Mizobe, Saitama; Masanori Imai, Fukui, all of Japan

[73] Assignee: Nitto Electric Industrial Co., Ltd., Osaka, Japan

[21] Appl. No.: 853,521

[22] Filed: Apr. 18, 1986

[30] Foreign Application Priority Data

Apr. 18, 1985 [JP] Japan .................... 60-83884

[51] Int. Cl.[4] .................. B32B 3/16; B32B 27/00; C08G 73/10; C08J 3/12
[52] U.S. Cl. .................. 428/402; 428/473.5; 528/188; 528/189
[58] Field of Search ................ 428/402, 473.5; 528/188, 189

[56] References Cited

U.S. PATENT DOCUMENTS

| | | | |
|---|---|---|---|
| 3,249,588 | 5/1966 | Gall | 528/26 X |
| 4,473,525 | 9/1984 | Sasaki et al. | 524/323 |
| 4,520,071 | 5/1985 | Noda et al. | 425/402 |
| 4,528,004 | 7/1985 | Makino et al. | 428/473.5 |
| 4,568,715 | 2/1986 | Itatani et al. | 524/348 |

FOREIGN PATENT DOCUMENTS

| | | |
|---|---|---|
| 0046074 | 2/1982 | European Pat. Off. |
| 57200452 | 6/1956 | Japan . |
| 903272 | 8/1962 | United Kingdom . |
| 981543 | 2/1965 | United Kingdom . |
| 1237432 | 6/1971 | United Kingdom . |
| 2037305 | 7/1980 | United Kingdom . |

*Primary Examiner*—John E. Kittle
*Assistant Examiner*—Susan S. Rucker
*Attorney, Agent, or Firm*—Sughrue, Mion, Zinn, Macpeak, and Seas

[57] ABSTRACT

A polyimide powder which can provide a molding having excellent both strength and heat resistance by heat-press molding, and a method for producing such polyimide powder are disclosed. The polyimide powder comprises spherical polyimide particles having a particle size distribution of from 0.5 to 20 μm and a mean particle diameter of from 1 to 15 μm, and comprising a repeating unit represented by the formula

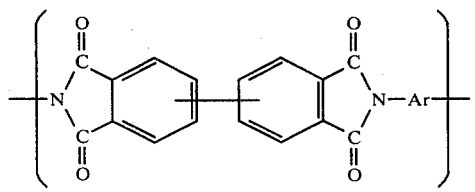

wherein Ar represents an aromatic diamine residue.

2 Claims, 3 Drawing Sheets

POLYIMIDE POWDER AND METHOD FOR PRODUCING THE SAME

FIELD OF THE INVENTION

The present invention relates to a polyimide powder which can provide a polyimide molding by compression molding under heating, and to a method for producing the same.

BACKGROUND OF THE INVENTION

Various methods for producing a polyimide powder have heretofore been proposed. One of the methods is a method comprising producing a high molecular weight polyamide acid by reacting an aromatic tetracarboxylic dianhydride and an aromatic diamino compound in an organic polar solvent such as N-methyl-2-pyrrolidone at a relatively low temperature, adding the resulting high molecular weight polyamide acid to a poor solvent therefor such as water, toluene or hexane, to precipitate a polyamide acid fine powder, removing the solvent, separating the fine polyamide acid by filtration and heat drying the fine polyamide acid at a temperature of from 200° to 300° C. to obtain a polyimide powder.

However, the polyimide powder obtained by the above proposed method has the problems that the particle size thereof is scattered and the particle size distribution is extremely broad, and more particularly, the polyimide powder obtained by using water as a precipitant does not form a high molecular weight polyimide since the amide acid produced is hydrolyzed by contacting water, causing a problem in heat resistance. In addition, another problem is that a molding made from such polyimide powder obtained by compression molding under heating has particularly poor mechanical strength.

Recently, a novel method has been proposed as disclosed, for example, in Japanese Patent Application (OPI) No. 200452/82 (the term "OPI" as used herein refers to a "published unexamined Japanese patent application"). According to this method, polyamide acid is not precipitated in the form of fine particles as described above, but polyimide is directly precipitated in an organic solvent in the form of a polyimide wherein reaction has further proceeded. This method comprises dissolving substantially equimolar amounts of a biphenyltetracarboxylic acid component and an aromatic diamine component in a specific polyimide-insoluble and high boiling amide-based solvent at a temperature of 155° C. or less to prepare a homogeneous solution having a low rotating viscosity, and heating the resulting solution to a temperature of from 160° to 300° C. in a short period of time with stirring and maintaining the solution at the same temperature to precipitate a powder-like aromatic polyimide having a relatively low molecular weight.

This proposed method has been provided to produce a polyimide powder directly by precipitating the polyimide without employing the two steps of producing a high molecular weight polyamide acid and then heating an organic polar solvent solution of the polyamide acid to a high temperature to imidate the polyamide acid and precipitate the polyimide as a powder. In short, this method has been intended to shorten the manufacturing time.

However, the above proposed method also has the problem that the particle size of the polyimide powder is scattered and the particle size distribution is very broad, since in this method a high molecular weight polyamide acid is not previously produced, rather, the polyimide powder is directly precipitated by rapidly heating to a high temperature of from 160° to 300° C. before the high molecular weight polyamide acid is produced, and as a result, a molding made from the polyimide powder by compression molding under heating (hereinafter referred to as "heat-press molding")also has poor mechanical strength. In addition, the molding is slightly inferior in heat resistance to that made from the above-described conventional polyimide powder produced through polyamide acid.

Thus, a polyimide powder which can provide a molding having excellent strength and heat resistance by heat-press molding has been not obtained by any conventional methods. Improvement thereof has been strongly demanded.

SUMMARY OF THE INVENTION

As a result of an investigation on the cause of the low mechanical strength of the conventional moldings obtained by heat-press molding a polyimide powder, the inventors have found that resin particles forming the molding are not melt-joined to each other but the particles are only sintered, that is, the resin particles are partly joined at mutual contacting points while maintaining their original shape.

As a result of further investigation, the inventors have also found that if the polyimide particles of polyimide powder are constituted of biphenyltetracarboxylic dianhydride and an aromatic diamino compound, the shape of the particles is spherical and the size of the particles is uniform and fine, the resin particles are not partly joined while maintaining the original shape thereof but they are melt-joined to each other so as to be integrated into one body as the whole thereof when the polyimide particles are molded by heat-press curing, and as a result, a molding having very excellent mechanical strength can be obtained from such polyimide particles.

Accordingly, an object of the present invention is to provide a polyimide powder which can provide a molding having excellent both strength and heat resistance by heat-press molding.

Another object of the invention is to provide a method for producing such polyimide powder.

The polyimide powder according to the present invention comprises spherical polyimide particles having a particle size distribution of from 0.5 to 20 μm and a mean particle diameter of from 1 to 15 μm, and comprising a repeating unit represented by the formula

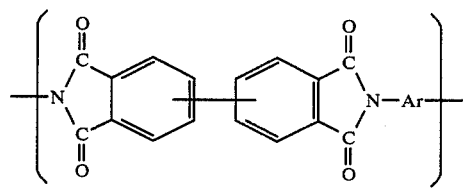

wherein Ar represents an aromatic diamine residue.

The method for producing a polyimide powder according to the present invention comprises preparing a solution of a high molecular weight polyamide acid obtained by reacting biphenyltetracarboxylic dianhydrides and an aromatic diamino compound, heating the solution to a temperature of from 140° to 250° C. in a short period of time to imidate the polyamide acid while removing condensation water produced by the imidation from the solution, thereby precipitating polyimide particles so as to produce a slurry-like product and taking out the polyimide particles from the slurry-like product.

DETAILED DESCRIPTION OF THE INVENTION

Figure 2:
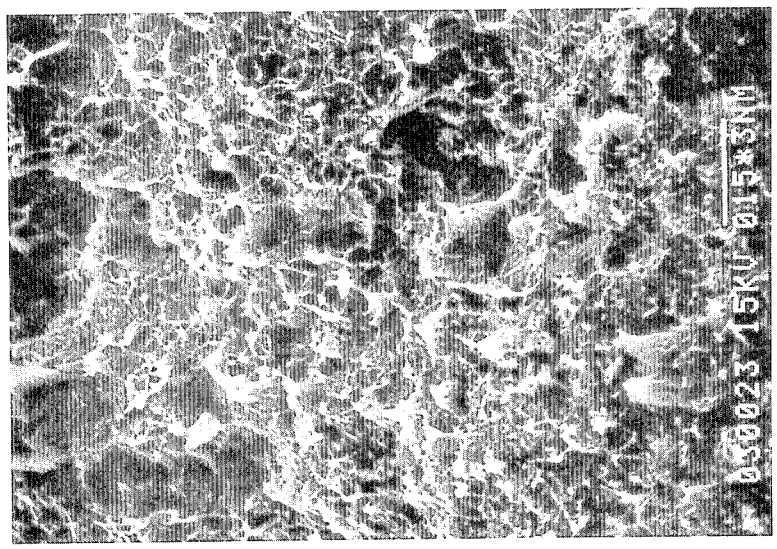
FIG. 2 is an electron micrograph of 950 magnifications showing the particle structure in a cross-section of a molding made of the polyimide powder shown in FIG. 1.

The polyimide powder of this invention is obtained, for example, by the reaction between biphenyltetracarboxylic dianhydride represented by the formula (1)

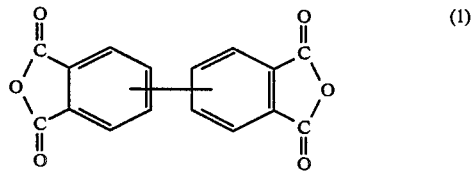

or its derivatives such as esters or acid chlorides, and an aromatic diamino compound. Hereinafter, in this specification, biphenyltetracarboxylic dianhydride and its derivatives are generally referred to as biphenyltetracarboxylic dianhydrides.

Biphenyltetracarboxylic dianhydride of the formula (1) includes the following two formulae (2) and (3):

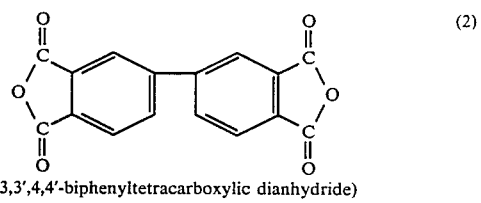

(3,3',4,4'-biphenyltetracarboxylic dianhydride)

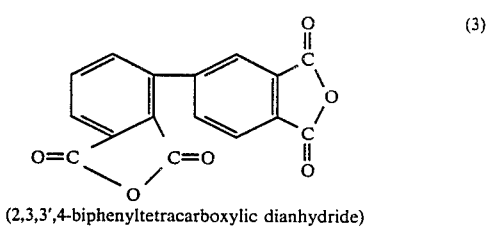

(2,3,3',4-biphenyltetracarboxylic dianhydride)

The compounds having the formulae (1) and (2) can be used alone or in combination, and the derivatives thereof can also be used.

Of these, the preferred are anhydrides. Particularly, it is preferred to use 3,3',4,4'-biphenyltetracarboxylic dianhydride (hereinafter referred to as "s-BPDA") alone from the standpoint of the strength and heat resistance of the polyimide moldings obtained. Although 2,3,3',4'-biphenyltetracarboxylic dianhydride (hereinafter referred to as "a-BPDA") can form polyimide particles melt-joined in a wide temperature range, the greater amount thereof used causes a reduction in heat resistance. Accordingly, in the case of use in combination, it is desired that s-BPDA is used in the proportion greater than a-BPDA. The preferred molar ratio of s-BPDA to a-BPDA is 70 to 30.

The aromatic tetracarboxylic anhydride can be replaced with a part of the above-described biphenyltetracarboxylic dianhydrides so long as the characteristics of polyimide moldings do not deteriorate. In this case, the amount replaced is up to 10 mol% or less, preferably 5 mol% or less, based on the total amount of biphenyltetracarboxylic dianhydride.

Examples of the aromatic tetracarboxylic dianhydride include pyromellitic dianhydride, 3,3',4,4'-benzophenone tetracarboxylic dianhydride, 4,4'-oxydiphthalic dianhydride, 4,4'-bis(3,4-dicarboxyphenoxy)-diphenylsulfone dianhydride, 2,2'-bis(3,4-dicarboxyphenyl)hexafluoropropane dianhydride, 2,3,6,7-naphthalene tetracarboxylic dianhydride, 1,2,5,6-naphthalene tetracarboxylic dianhydride, and 1,4,5,8-naphthalene tetracarboxylic dianhydride.

Representative examples of the aromatic diamino compounds reacted with the above-described biphenyltetracarboxylic dianhydrides are as follows. These compounds are used alone or in combination.

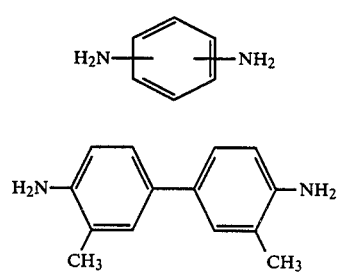

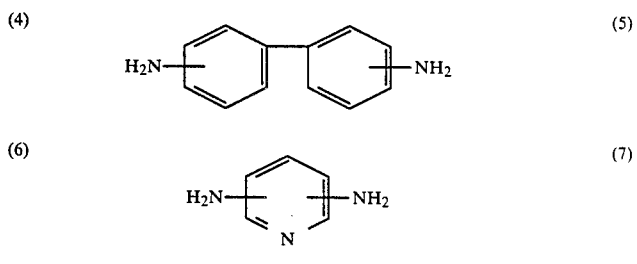

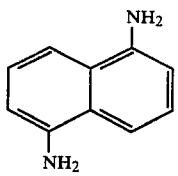
(8)

-continued

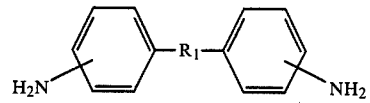
(9)

($R_1$: O, $CH_2$, $C(CH_3)_2$, $SO_2$, S)

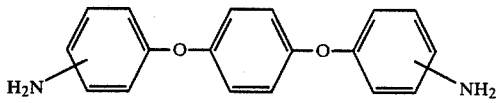
(10)

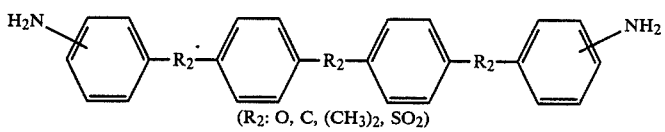
(11)

($R_2$: O, C, $(CH_3)_2$, $SO_2$)

Of these compounds, p-phenylene diamine, m-phenylene diamine, 4,4'-diaminobiphenyl, 3,5-diaminopyridine, 4,4'-diaminodiphenyl ether, 3,4'-diaminodiphenyl ether, 1,4-bis(4-aminophenoxy)benzene, bis[4-(4-aminophenoxy)phenyl]sulfone, and 2,2-bis[4-(4-aminophenoxy)phenyl]propane are preferred. The more preferred aromatic diamino compounds are the compounds represented by the formula (9). Of these, the most preferred are ether-form compounds wherein $R_1$ is O. By combining the ether-form compounds with the above-described s-BPDA, a polyimide powder which can provide a polyimide molding having markedly excellent strength and heat resistance as compared to the conventional polyimide molding can be obtained.

The polyimide powder of the present invention can be produced as follows.

The substantially equimolar amounts of the biphenyltetracarboxylic dianhydrides and aromatic diamino compounds are reacted in an organic polar solvent at a temperature of 80° C. or less to synthesize a high molecular weight polyamide acid. The thus obtained polyamide acid is heated to a temperature of from 140° to 250° C. in a short period of time to imidate the polyamide acid while removing condensation water produced by the imidation to outside the system, thereby precipitating polyimide particles and making the reaction solution in the form of a slurry. The polyimide particles are separated from the slurry by filtration or centrifugal separation and then the separated polyimide particles are dried by heating at a temperature of from 100° to 400° C. to thereby obtain a polyimide powder.

This method has been developed by the present inventors. According to this method, a high molecular weight polyamide acid is first produced, a system wherein polyimide particles are precipitated is converted in the form of slurry by using the high molecular weight polyamide acid, and the subsequent polyimide particles are then precipitated in the slurry. The polyimide powder comprising spherical polyimide particles having a particle size distribution of from 0.5 to 20 μm and a mean particle diameter of from 1 to 15 μm can be automatically obtained by the resistance in the precipitating stage of the polyimide particles into the slurry, the effect of using a high molecular weight polyamide acid, and so on. In addition, since this method produces a polyimide powder by a mechanism where a high molecular weight polyamide acid is first produced at a low temperature and the polyamide acid is then heated for imidation so as to precipitate polyimide particles which have become insoluble to the reaction solvent, a polyimide powder which can provide a molding having excellent heat resistance can be produced.

According to this method, in most cases, a number of pleats are formed on the outer surface of the spherical polyimide particles. In the polyimide particles having such shape, when heat-press molding, the area of each resin particle contacting the adjacent particles becomes larger, and heat conduction is well performed through the pleats so that melting can be more smoothly conducted, whereby a molding having extremely excellent mechanical strength can be produced. In addition, according to this method, polyamide acid having a biphenyltetracarboxylic acid residue is obtained in the course of the production of the polyimide powder. This polyamide acid is hardly hydrolyzed by heating. Accordingly, the hydrolysis of amide acid is hardly made by the condensation water during the heat-imidation after the production of a high molecular weight polyamide acid at the initial stage of condensation, so that a high molecular weight polyimide powder can be obtained. Consequently, even in a polyimide having the same chemical structure, highly heat resistant polyimide powder can be obtained, thereby achieving the improvement in heat resistance of a molding therefrom.

A specific solvent is not required as an organic polar solvent used in producing the polyimide powder according to the present invention but a conventional solvent can be used. Examples of the solvent include N-methyl-2-pyrrolidone, N,N'-dimethylacetamide, N,N'-dimethylformamide, dimethylsulfoxide, hexamethylphosphoramide, etc.

Another method for producing the polyimide powder of the present invention comprises producing a polyimide powder by a conventionally known method, and classifying the resulting powder by meshing to obtain polyimide particles having a particle size distribution of from 0.5 to 20 μm and a mean particle diameter of from 1 to 15 μm. However, the method is inferior in production efficiency, and hardly produces spherical polyimide particles. Accordingly, the method is not preferred.

The thus produced polyimide powder of the present invention comprises polyimide particles having a particle size distribution of from 0.5 to 20 μm and a mean particle diameter of from 1 to 15 μm, having a spherical shape and comprising a repeating unit represented by the above-described formula. Therefore, the resin particles are melted and integrated into one body in heat-pressed molding so that a resulting molding has excellent mechanical strength. In addition, the thus obtained molding has also excellent heat resistance.

One of the characteristics of the polyimide powder according to the present invention is that the polyimide particles are spherical, and this characteristic contributes to the melting property thereof. The terminology "spherical" used herein means not only a true sphere having a true circular cross-section but a shape of a substantially spherical shape having a substantially circular cross-section such as an ellipsoid having an eliptical cross-section. The terminology further encompasses a shape of a group of several particles which are integrally connected to each other as if they are a single spherical particle.

Another characteristic of the polyimide powder is that the particle diameter of the polyimide particles is fine as described above and the particles have a uniform size. This characteristic greatly contributes to the formation of a tough molding in combination with the effect of the molecular structure and spherical shape of the polyimide particles. In measuring the particle diameter, if the particle is not a true sphere but an ellipsoid, or the like, the longest diameter thereof is measured as the standard particle diameter thereof. The measurement is conducted using a scanning electron microscope. The shape and size of the particle cannot be accurately measured using microscopes other than a scanning electron microscope.

Other materials can be suitably selected and used alone or in combination with the polyimide powder of the present invention. Examples of the materials include metal fine powder, metal oxides, a mineral, inorganic compounds, grinding powder, glass powder, whiskers, graphite powder, and other high-temperature polymer powders (such as polytetrafluoroethylene powder). A method for mixing the polyimide powder and such materials uniformly and densely is a method comprising adding the above-described materials in the slurry state an optional stage in the synthesis of the polyamide acid and sufficiently mixing the mixture, followed by heat-imidation. According to this method, two types of polyimide powder can be selectively obtained. That is, one type is one where the above-described materials are closely mixed with the polyimide particles, and the other type is one where the polyimide particles have a two-layer structure in which the materials are coated with polyimide. Accordingly, a polyimide powder having properties optimum for the desired use can be produced by the proper selection of the above-described materials.

The polyimide powder constructed as described above according to the present invention can be used to form a molding by heat-press molding in an embodiment quite different from a conventional method in which adjacent resin particles are sintered while maintaining their original shape in heat-press molding. That is, since the polyimide powder of the present invention is quite different from conventional ones, the polyimide powder of the present invention can form a molding such that adjacent resin particles are melted and connected to each other in an integrated body so that the resulting molding has a highly fine integrated structure which is extremely improved in mechanical strength. Further, the heat resistance is not all deteriorated and shows a good value.

In the method for producing a polyimide powder according to the present invention, the polyimide powder is produced after formation of a high molecular weight polyamide acid. The high molecular weight polyamide acid has a biphenyltetracarboxylic acid residue and therefore it is hardly hydrolyzed by heating. Accordingly, the hydrolysis of amide acid is hardly occurs by the condensation water during the heat-imidation thereof, so that a high molecular weight polyimide powder can be obtained. Thus, it is possible to obtain a polyimide powder which can provide a molding having not only excellent mechanical strength but excellent heat resistance. Further, the high molecular weight polyamide acid is first produced, and polyimide particles are precipitated by the use of the high molecular weight polyamide acid to make the solution slurry-like, thereby progressively precipitating the subsequent polyimide particles. Accordingly, it is possible to obtain a polyimide powder comprising fine polyimide particles having an uniform size due to the resistance in the precipitation stage of the polyimide particles into the slurry and the effect in the use of the high molecular weight polyamide acid, in a high yield. In particular, according to the method of the present invention, in most cases, a number of pleats are formed on the outer surfaces of the spherical polyimide particles, and the polyimide particles having pleats have a larger area contacting adjacent particles in the case of heat-press molding, so that the melting property to the adjacent resin particles is further improved. Accordingly, it is possible to obtain a molding having more excellent mechanical strength.

In a polyimide powder, generally, if the heat resistance is increased, the molding property is extremely deteriorated so that the mutual sintering between adjacent resin particles cannot be uniformly effected even if molding is at a high temperature and a high pressure, and the resulting molding does not show a theoretical value of mechanical strength. According to the polyimide powder of the present invention, it is possible to obtain a molding having an extremely excellent mechanical strength by heat-press molding.

The present invention will be described in more detail by reference to examples, but it should be understood that the present invention is not limited to those examples.

EXAMPLE 1

Under a nitrogen stream, 60.0 g (0.3 mol) of 4,4'-diaminodiphenyl ether and 593 g of N-methyl-2-pyrrolidone (NMP) were put into a 1 l four-necked separable flask equipped with a stirring, a selector-containing reflux condensor and a thermometer and the diamino compound was dissolved. While maintaining the temperature of the reaction system at lower than 30° C., 88.2 g (0.3 mol) of s-BPDA was gradually added thereto, followed by stirring for about 2 hours to synthesize polyamide acid. The logarithmic viscosity of the polyamide acid thus obtained was 2.1 (30° C., 0.5 g/100 ml NMP). The polyamide acid solution was heated by a mantle heater. At a temperature from about 90° C. to about 100° C., water was trapped in the selector. When the temperature of the solution reached 100° C., the rotating speed of the stirrer was increased to 500 rpm. After the temperature reached 180° C. in about 2 hours, the reacting solution began to become turbid. Polyimide powder was precipitated and the reaction solution became in a slurry state. After the stirring at a temperature within a range from 180° to 200° C. for further 2 hours, the reaction was completed. After cooling the system to a room temperature, the slurry-like product was filtered with suction, and the filtrate was thoroughly washed with NMP, washed with ion-exchange water, washed with methanol, and dried by heating at 150° C. for 3 hours and at 250° C. for a further 3 hours to obtain 128 g of polyimide powder (yield: 93.2%).

The logarithmic viscosity of the thus obtained polyimide powder was 1.18 (at 30° C., in 0.5 g/100 ml concentrated sulfuric acid). The diameter of the polyimide grains was measured by a scanning electron microscope. The mean particle diameter was 6.6 μm and the respective particle diameter of all particles was within a range from 1 to 10 μm.

The polyimide powder was put into a mold and molded under a pressure of 300 kg/cm² at 400° C. for 60 minutes by hydraulic pressing. The bending strength and elongation of the thus obtained molding were measured. The bending strength was 1700 kg/cm² (ASTM D-790) and the elongation was 11% (ASTM D-1708).

Figure 1:
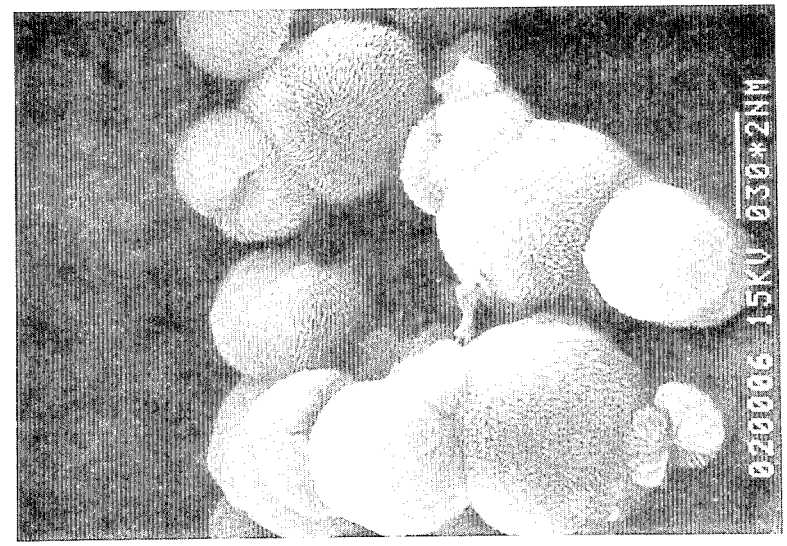
FIG. 1 is an electron micrograph of 4800 magnifications showing the particle structure of a polyimide powder in the example of the present invention.

A scanning electron micrograph of 4800 magnifications showing the crystal structure of the above polyimide particles is shown in FIG. 1 and a scanning electron micrograph of 950 magnifications showing the particle structure in a cross-section of a molding made of the polyimide particles after measurement of the bending strength thereof is shown in FIG. 2.

EXAMPLE 2

Polyimide powder was obtained in the same manner as described in Example 1 except that the 4,4'-diaminodiphenyl ether was replaced by p-phenylene diamine.

In this case, the yield of the polyimide powder was 91.1%, and the logarithmic viscosity of the thus obtained polyimide powder was 0.37 (30° C., 0.5 g/100 ml concentrated sulfuric acid). The diameter of the polyimide particles was measured by a scanning electron microscope. The mean particle diameter was 3.2 μm and the respective particle diameter of all particles was within a range from 1 to 10 μm.

Using the polyimide powder thus obtained, a molding was produced in the same manner as described in Example 1. The bending strength and elongation of the molding were measured. The bending strength was 910 kg/cm² (ASTM D-790) and the elongation was 6.0% (ASTM D-1708).

Figure 4:
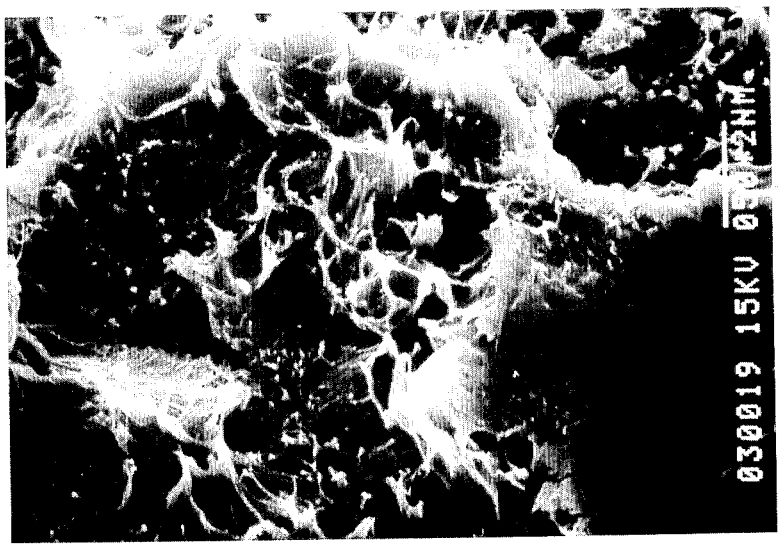
FIG. 4 is an electron micrograph of 3000 magnifications showing the particle structure in a cross-section of a molding made of the polyimide powder shown in FIG. 3.
Figure 3:
FIG. 3 is an electron micrograph of 9500 magnifications showing the particle structure of a polyimide powder in other example of the present invention.

A scanning electron micrograph of 9500 magnifications showing the particle structure of the above polyimide particles is shown in FIG. 3 and a scanning electron micrograph of 3000 magnifications showing the particle structure in a cross-section of a molding made of the polyimide particles after measurement of the bending strength thereof is shown in FIG. 4.

EXAMPLE 3

Polyimide powder was obtained in the same manner as described in Example 1 except that the s-BPDA used in Example 1 was replaced by a mixture of s-BPDA and a-BPDA in such amounts that the molar ratio thereof was 70:30, that is, the amount of s-BPDA was 61.7 g (0.21 mol) and the amount of a-BPDA was 26.46 g (0.09 mol).

In this case, the yield of the polyimide powder was 88.2%, and the logarithmic viscosity of the thus obtained polyimide powder was 1.21 (30° C., 0.5 g/100 ml concentrated sulfuric acid). The diameter of the polyimide particles was measured by a scanning electron microscope. The mean particle diameter was 5.2 μm and the respective particle diameter of all particles was within a range from 1 to 12 μm.

Using the polyimide powder thus obtained, a molding was produced in the same manner as described in Example 1. The bending strength and elongation of the molding were measured. The bending strength was 1200 kg/cm² (ASTM D-790) and the elongation was 9.2% (ASTM D-1708).

EXAMPLE 4

Polyimide powder was obtained in the same manner as described in Example 3 except that the 4,4'-diaminodiphenyl ether was replaced by 4,4'-diaminodiphenylsulfone.

In this case, the yield of the polyimide powder was 91.2%, and the logarithmic viscosity of the thus obtained polyimide was 1.10 (30° C., 0.5 g/100 ml concentrated sulfuric acid). The diameter of the polyimide particles was measured by a scanning electron microscope. The mean particle diameter was 3.2 μm and the respective particle diameter of all particles was within a range from 1 to 9 μm.

Using the polyimide powder thus obtained, a molding was produced in the same manner as described in Example 1. The bending strength and elongation of the molding were measured. The bending strength was 1100 kg/cm² (ASTM D-790) and the elongation was 8.3% (ASTM D-1708).

COMPARATIVE EXAMPLES

Comparison was made with the method disclosed in Japanese Patent Unexamined Published Application No. 200452/82.

In this case, polyimide powder is not produced through polyamide acid as described in Example 1 but is directly produced. That is, similar to the manner as described in Example 1, the same amounts of 4,4'-diaminodiphenyl ether and N-methyl-2-pyrrolidone were put into the same type of the flask as used in Example 1, and the same amount of s-BPDA was added thereto. The resulting mixture was stirred under a nitrogen stream. The stirring was not continued at a low temperature as described in Example 1, but the mixture solution was heated up to 125° C. in about 1 hour. After maintaining the solution at the temperature of 125° C. for further 1 hour, the solution was heated up to 200° C. in about 0.5 hour while refluxing the solvent and water formed and removing a part of the water formed. At this time, the reaction solution began to become turbid from 180° C. and polyimide powder was precipitate. The polyimide powder was filtered with suction, and the filtrate was washed with NMP, thoroughly washed with ion-exchange water of about 80° C., pre-dried by heating at 80° C., and dried by heating at 140° C. for 10 hours.

The logarithmic viscosity of the thus obtained polyimide powder was 0.62 (30° C., 0.5 g/100 ml concentrated sulfuric acid). The mean particle diameter and particle size distribution in the polyimide powder were measured in the same manner as described in Example 1. The result was that although the mean particle diameter was 15.6 μm, the scattering of particle diameter was remarkable and the respective particle diameters were distributed within a wide range up to 27 μm.

Using the polyimide powder thus obtained, a molding was produced in the same manner as described in Example 1. The bending strength and elongation of the molding were measured. As the results, the bending strength was 685 kg/cm² (ASTM D-790) and the elongation was 7.5% (ASTM D-1708).

Figure 6:
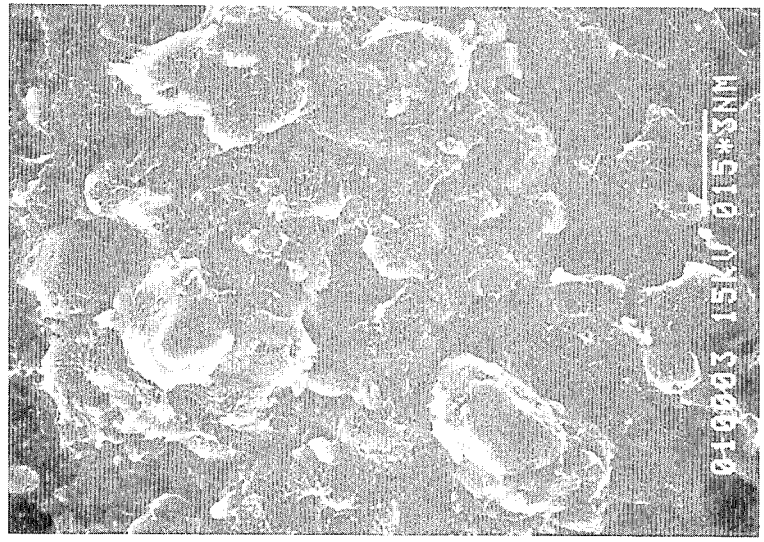
FIG. 6 is an electron micrograph of 950 magnifications showing the particle structure in a cross-section of a molding made of the polyimide powder shown in FIG. 5.
Figure 5:
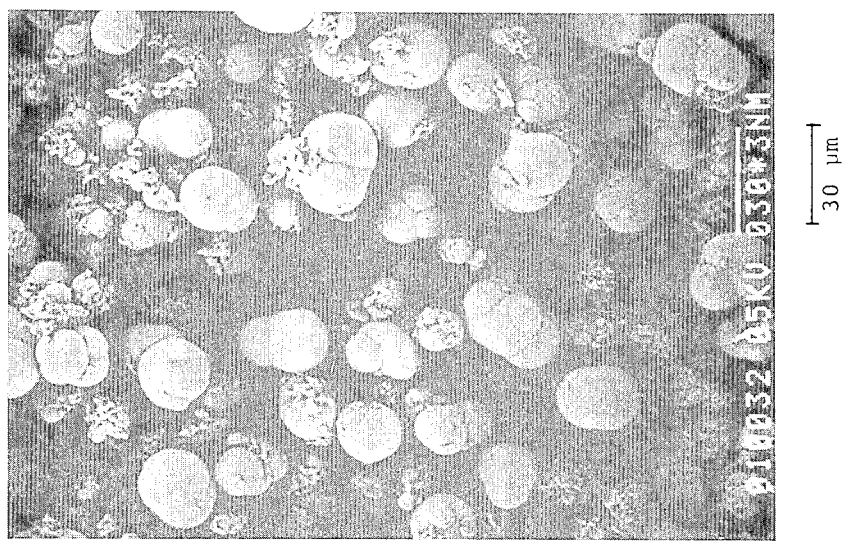
FIG. 5 is an electron micrograph of 490 magnifications showing the particle structure of a polyimide in the comparative example.

A scanning electron micrograph of 490 magnifications showing the particle structure of the polyimide powder is shown in FIG. 5, and a scanning electron micrograph of 950 magnifications showing the particle structure in cross-section of the molding after measurement of the bending strength thereof is shown in FIG. 6.

From the comparison between FIGS. 1 and 5, it is apparent that the polyimide powder of the Comparative Example (FIG. 5) has a large particle diameter whereas the polyimide powder of Example 1 (FIG. 1) has a small particle diameter. However, neither the particles of FIGS. 1 or 5 had a substantial difference in the pleats on the outer surface. The polyimide powder of Example 2 (FIG. 3) remarkably had pleats. In the cross-sections of the moldings made from the polyimide powder of Examples 1 and 2, there are no traces of resin particles. This shows that the resin particles have been melted and integrated with each other. On the other hand, in the cross-section of the molding made from the polyimide of the Comparative Example, the resin particles remain with the original shape thereof. This shows that the resin particles have been sintered only at the points contacting the adjacent particles.

While the invention has been described in detail and with reference to specific embodiments thereof, it will be apparent to one skilled in the art that various changes and modifications can be made therein without departing from the spirit and scope thereof.

What is claimed is:

1. A polyimide powder having pleats formed on the outer circumferential surface thereof comprising spherical polyimide particles having a particle size distribution of from 0.5 to 20 μm and a mean particle diameter of from 1 to 15 μm, and comprising a repeating unit represented by the formula

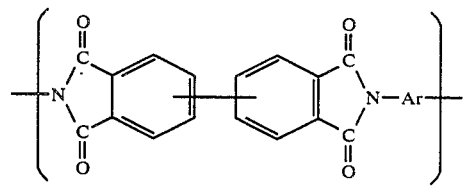

wherein Ar represent an aromatic diamine residue, which polyimide powder is formed by the process which comprises:
   preparing a solution of a high molecular weight polyamide acid obtained by reacting biphenyltetracarboxylic dianhydrides and an aromatic diamino compound;
   heating the solution to a temperature of from 140° to 250° C. to imidate the polyamide acid while simultaneously removing condensation water produced by the imidation from the solution, thereby precipitating polyimide articles to yield a slurry;
   separating the polyimide particles from the slurry; and
   drying the polyimide particles by heating at a temperature of from 100° to 400° C. to thereby obtain said polyimide powder.

2. A molded product formed by heat-press molding the polyimide product of claim 1.

* * * * *